United States Patent
Sirohey et al.

(10) Patent No.: US 7,868,884 B2
(45) Date of Patent: Jan. 11, 2011

(54) SYSTEM AND METHOD FOR GENERATING A DIGITAL IMAGE OF AN INTERNAL ANATOMY OF A PERSON

(75) Inventors: Saad Sirohey, Pewaukee, WI (US); Toan Thanh Le, Germantown, WI (US); Tinsu Pan, Houston, TX (US); Shiying Hu, Waukesha, WI (US); Litao Yan, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 1479 days.

(21) Appl. No.: 10/711,189

(22) Filed: Aug. 31, 2004

(65) Prior Publication Data

US 2006/0044304 A1    Mar. 2, 2006

(51) Int. Cl.
    *G06T 15/00* (2006.01)
(52) U.S. Cl. .................................................. 345/419
(58) Field of Classification Search ........................ None
    See application file for complete search history.

(56) References Cited

U.S. PATENT DOCUMENTS

| | | | | |
|---|---|---|---|---|
| 5,846,204 | A * | 12/1998 | Solomon ..................... | 600/463 |
| 6,201,393 | B1 * | 3/2001 | Bernstein et al. ............ | 324/309 |
| 6,269,140 | B1 * | 7/2001 | Takagi et al. .................. | 378/8 |
| 6,292,684 | B1 * | 9/2001 | Du et al. ....................... | 600/410 |
| 6,450,962 | B1 * | 9/2002 | Brandl et al. ................. | 600/458 |
| 6,522,712 | B1 * | 2/2003 | Yavuz et al. ................... | 378/4 |
| 6,678,346 | B2 | 1/2004 | Hsieh ............................ | 378/4 |
| 7,620,444 | B2 * | 11/2009 | Le et al. ....................... | 600/428 |
| 2003/0188757 | A1 * | 10/2003 | Yanof et al. .................. | 128/916 |
| 2005/0078858 | A1 * | 4/2005 | Yao et al. ..................... | 382/128 |
| 2005/0135558 | A1 * | 6/2005 | Claus et al. ................... | 378/42 |
| 2005/0201509 | A1 * | 9/2005 | Mostafavi et al. ............. | 378/8 |

OTHER PUBLICATIONS

Caoili, E., Cohan, R., Korobkin, M., Platt, J., Francis, I., Faerber, G., Montie, J., Ellis, J., Urinary Tract Abnormalities: Initial Experience with Multi-Detector Row CT Urography, Feb. 2002, Journals of the Radiological Society of North America (RSNA), vol. 222, Issue 2, pp. 353-360.*

* cited by examiner

*Primary Examiner*—Said Broome
(74) *Attorney, Agent, or Firm*—Cantor Colburn LLP

(57) ABSTRACT

A system and a method for generating a digital image indicative of an internal anatomy of a person over a respiratory cycle are provided. The method includes scanning the internal anatomy of the person at a plurality of positions along an axis to obtain scanning data, wherein the scanning at each position is performed over at least one respiratory cycle of the person. The method further includes generating a plurality of cross-sectional digital images based on the scanning data. The method further includes generating a plurality of cross-sectional digital image groups, each group comprising at least two digital images of the plurality of cross-sectional digital images wherein each of the two digital images indicate the internal anatomy at a substantially similar respiratory state. The method further includes generating a plurality of 3-D digital images, wherein each digital image of the plurality of 3-D digital images is determined from a corresponding one of the plurality of cross-sectional digital image groups. Finally, the method includes processing the plurality of 3-D digital images to obtain a resultant 3-D digital image indicating positions of at least a portion of the internal anatomy of the person during at least the respiratory cycle.

49 Claims, 8 Drawing Sheets

SYSTEM AND METHOD FOR GENERATING A DIGITAL IMAGE OF AN INTERNAL ANATOMY OF A PERSON

BACKGROUND OF THE INVENTION

Computerized tomography (CT) scanning devices have been utilized to generate digital images of an internal anatomy of a person. In particular, CT scanning devices have been used to generate digital images of tumors in the person. In order to treat tumors, medical professionals perform CT scans to obtain digital images of the internal tumor to determine the location of the tumor.

A significant drawback with other CT scanning methods is that a portion of an internal anatomy of a person, including tumors, located in the chest region moves during a CT scanning procedure. Accordingly, to determine the location the tumor during respiration, operators have required that a person stop respiration at a full expiration state to perform a first scan, and subsequently require the person to stop respiration at a full inspiration state to perform a second scan. A person who is extremely ill, however, may not be able to stop breathing at the required full expiration state and the full inspiration state. Accordingly, digital images indicating the full range of motion of the tumor may not be obtained using these methods.

Accordingly, there is a need for a system and method that can generate a digital image of an internal anatomy of the person during at least one respiratory cycle of the person that indicates a location of a tumor over the respiratory cycle.

BRIEF DESCRIPTION OF THE INVENTION

A method for generating a digital image indicative of an internal anatomy of a person over a respiratory cycle in accordance with an exemplary embodiment is provided. The method includes scanning the internal anatomy of the person at a plurality of positions along an axis to obtain scanning data, wherein the scanning at each position is performed over at least one respiratory cycle of the person. The method further includes generating a plurality of cross-sectional digital images based on the scanning data. The method further includes generating a plurality of cross-sectional digital image groups, each group comprising at least two digital images of the plurality of cross-sectional digital images wherein each of the two digital images indicate the internal anatomy at a substantially similar respiratory state. The method further includes generating a plurality of 3-D digital images, wherein each digital image of the plurality of 3-D digital images is determined from a corresponding one of the plurality of cross-sectional digital image groups. Finally, the method includes processing the plurality of 3-D digital images to obtain a resultant 3-D digital image indicating positions of at least a portion of the internal anatomy of the person during at least the respiratory cycle.

A system for generating a digital image indicative of an internal anatomy of a person over a respiratory cycle in accordance with another exemplary embodiment is provided. The system includes a respiratory monitoring device generating a first signal indicative of a respiratory state of the person. The system further includes a scanning device configured to scan an internal anatomy of the person to obtain scanning data. Finally, the system includes a computer operably coupled to both the respiratory monitoring device and the scanning device. The computer is configured to generate a plurality of cross-sectional digital images based on the scanning data. The computer is further configured to generate a plurality of cross-sectional digital image groups, each group comprising at least two digital images of the plurality of cross-sectional digital images wherein each of the two digital images indicate the internal anatomy at a substantially similar respiratory state. The computer is further configured to generate a plurality of 3-D digital images, wherein each digital image of the plurality of 3-D digital images is determined from a corresponding one of the plurality of cross-sectional digital image groups. The computer is further configured to process the plurality of 3-D digital images to obtain a resultant 3-D digital image indicating positions of at least a portion of the internal anatomy of the person during at least the respiratory cycle.

An article of manufacture in accordance with another exemplary embodiment is provided. The article of manufacture includes a computer storage medium having a computer program encoded therein for generating a digital image indicative of an internal anatomy of a person over a respiratory cycle. The computer storage medium includes code for inducing a scanning device to scan the internal anatomy of the person at a plurality of positions along an axis to obtain scanning data, wherein the scanning at each position is performed over at least one respiratory cycle of the person. The computer storage medium further includes code for generating a plurality of cross-sectional digital images based on the scanning data. The computer storage medium further includes code for generating a plurality of cross-sectional digital image groups, each group comprising at least two digital images of the plurality of cross-sectional digital images wherein each of the two digital images indicate the internal anatomy at a substantially similar respiratory state. The computer storage medium further includes code for generating a plurality of 3-D digital images, wherein each digital image of the plurality of 3-D digital images is determined from a corresponding one of the plurality of cross-sectional digital image groups. Finally, the computer storage medium includes code for processing the plurality of 3-D digital images to obtain a resultant 3-D digital image indicating positions of at least a portion of the internal anatomy of the person during at least the respiratory cycle.

DETAILED DESCRIPTION OF THE INVENTION

Figure 1:
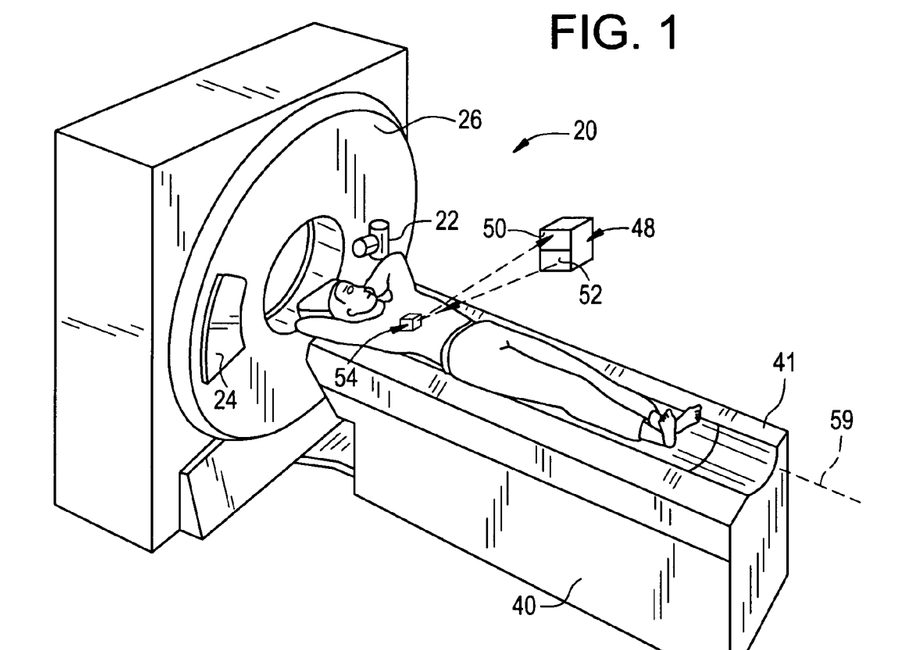
FIG. 1 is a schematic of a CT imaging system.
Figure 2:
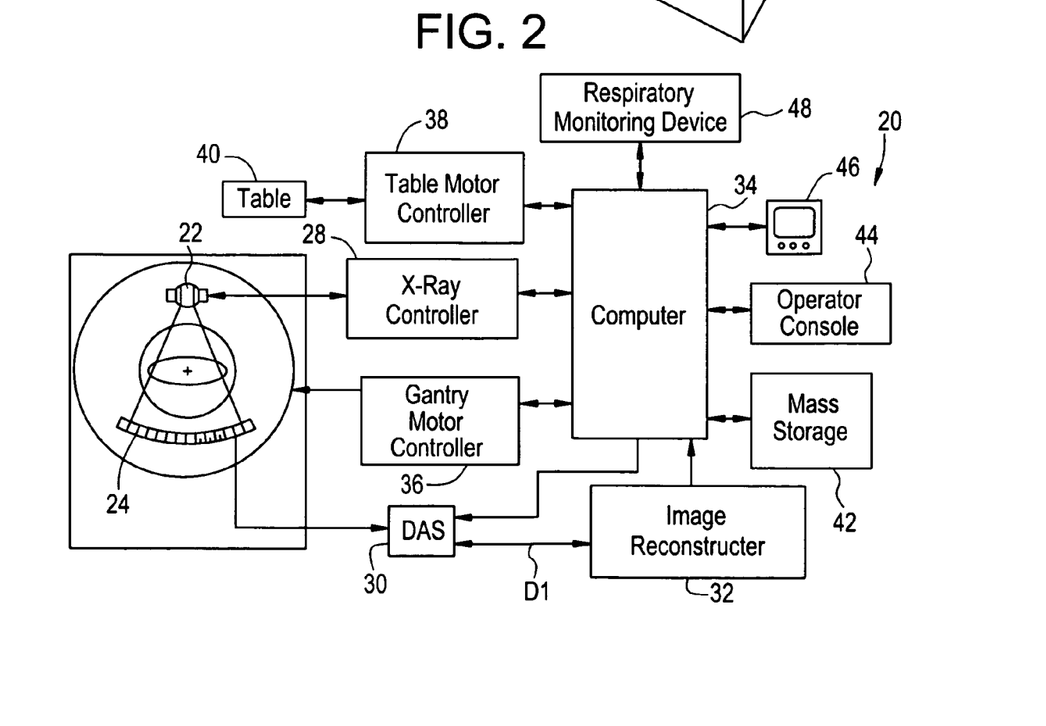
FIG. 2 is a block diagram of the CT imaging system of FIG. 1.

Referring to FIGS. 1 and 2, a CT imaging system 20 for generating a digital image of an internal anatomy of a person in accordance with an exemplary embodiment is shown. In particular, the CT imaging system or scanning device 20 generates a digital image of the internal anatomy of the person during at least one respiratory cycle to allow an operator to determine a tumor location in the person. The CT imaging system 20 includes up an x-ray source 22, an x-ray detector array 24, a gantry 26, an x-ray controller 28, a data acquisition system 30, an image reconstructor 32, a computer 34, a gantry motor controller 36, a table motor controller 38, a table 40, a memory unit 42, an operator console 44, a monitor 46, and a respiratory monitoring device 48.

The x-ray source 22 is provided to generate an x-ray beam that propagates through a person to the x-ray detector array 24. The x-ray source 22 is disposed on the gantry 26.

The x-ray detector array 24 is provided to receive attenuated x-rays from the x-ray source 22 that have propagated through a person and to generate a plurality of signals indicative of the attenuated x-rays. The x-ray detector array 24 is operably coupled to the data acquisition system 30.

The gantry 26 is provided to support the x-ray source 22 and the x-ray detector array 24. In particular, the x-ray source 22 is disposed across from the x-ray detector 24 on the gantry 26. The gantry 26 rotates both the x-ray source 22 and the x-ray detector array 24 at a predetermined rotational speed in response to a control signal received from the computer 34.

The x-ray controller 28 is provided to control the operation of the x-ray source 22. The x-ray controller 28 is operably coupled to the x-ray source 22 and to the computer 34. The x-ray controller 28 energizes the x-ray source 22 to emit x-ray beams in response to a control signal received from the computer 34.

The data acquisition system 30 is operably coupled to the x-ray detector array 24 and is further operably coupled to the computer 34 and to the image reconstructor 32. The data acquisition system 30 receive signals (D1) from the x-ray detector array 24 and transmits the signals (D1) to the image reconstructor 32.

The image reconstructor 32 is provided to generate digital images from the signals (D1). The image reconstructor 32 is operably coupled between the data acquisition system 30 and the computer 34. The image reconstructor 32 transmits the generated digital images to the computer 34.

The gantry motor controller 36 is provided to control the rotational position of the gantry 26. As shown, the gantry motor controller 36 is operably coupled to the gantry 26 and to the computer 34. The gantry motor controller 36 generates control signals that induce a motor (not shown) within the gantry 26 to rotate the gantry 26 at a predetermined rotational speed, in response to a control signal received from the computer 34.

The table motor controller 38 is provided to control a linear position of a plate 41 disposed on the table 40. In particular, the table motor controller 38 generates control signals that induce a linear actuator (not shown) within the table 40 to move the plate 41 to a predetermined linear position, in response to a control signal received from the computer 34.

The respiratory monitoring device 48 is provided to measure a respiratory state of the person lying on the table 40. The device 48 includes an infrared transmitter 52 and an infrared detector 50. As shown, the device 48 is disposed proximate the table 40. The infrared transmitter 52 directs an infrared beam towards a reflector 54 positioned on a chest of the person. The infrared beam is thereafter reflected from the infrared reflector 54 towards the infrared detector 50. The infrared detector 50 receives the reflected infrared beam and generates a signal 200 that is indicative of the position of the chest responsive to the reflected infrared beam. The position of the chest of the person is further indicative of the respiratory state of the person.

The computer 34 is operably coupled to the x-ray controller 28, the data acquisition system 30, the image reconstructor 32, the gantry motor controller 36, the table motor controller 38, the memory unit 42, an operator console 44, a computer console 46, and the respiratory monitoring device 48. The computer 34 generates a first control signal for inducing the table motor controller 38 to control position of the table 40.

The computer 34 generates a second control signal for inducing the x-ray controller 28 to induce x-ray source 22 to generate x-ray beams. Further, the computer 34 generates a third control signal for inducing the gantry motor controller 36 to rotate the gantry 26. Further, the computer 34 generates a fourth control signal to induce a data acquisition system 30 to sample signals received from the x-ray detector array 24. In response, the system 30 transmits the signals received from the x-ray detector array 24 to the image reconstructor 32. Thereafter, the image reconstructor 32 generates digital images based upon the signals received from the data acquisition system 30 and transmits the digital images to the computer 34. Thereafter, the computer 34 either (i) displays the images on the monitor 46, (ii) stores the digital images in the memory unit 42, or both. The operator console 44 is operably coupled to the computer 34 to allow the user to request one or more digital images for viewing on the display monitor 46.

Figure 3:
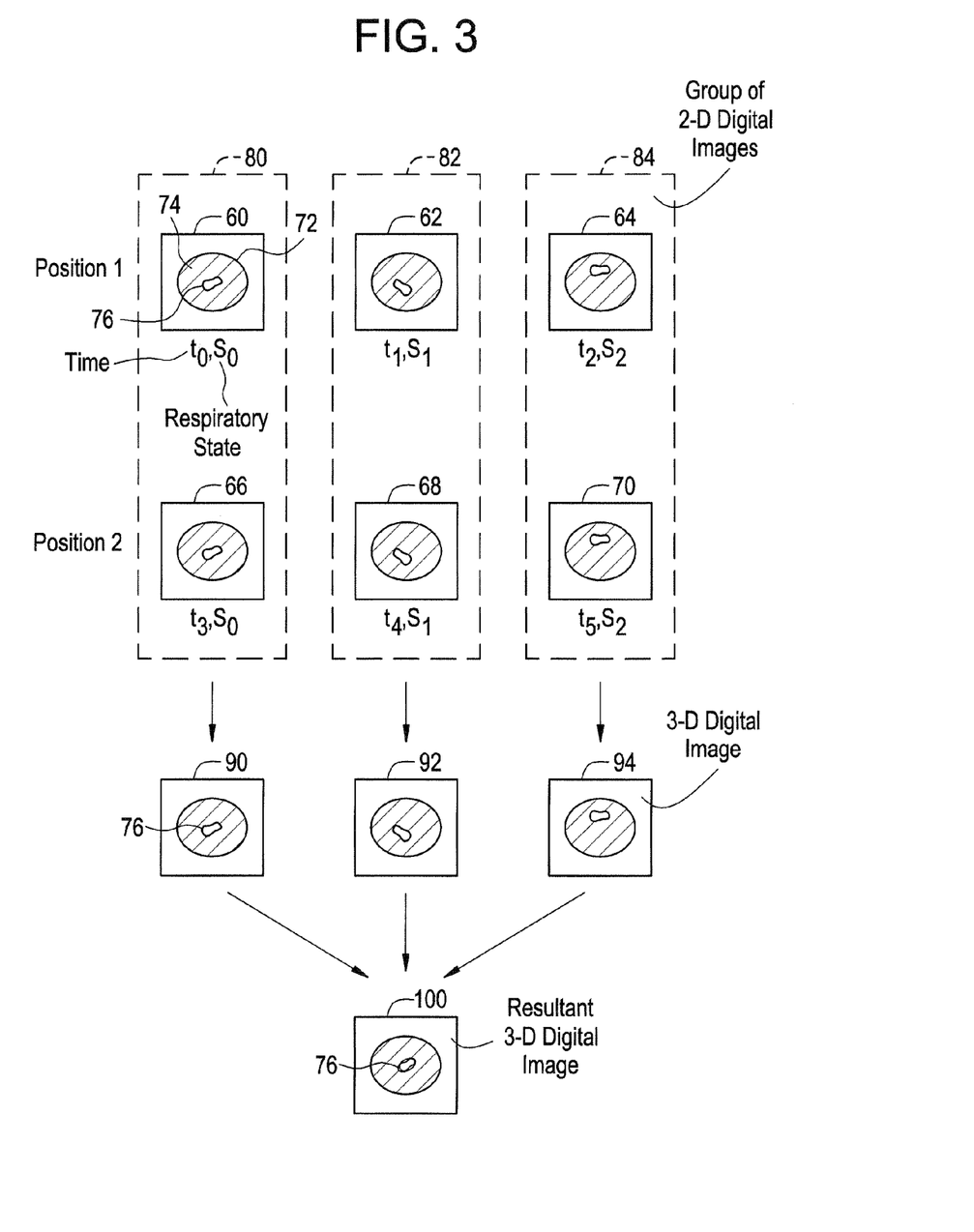
FIG. 3 is a schematic of a plurality of digital images generated by the CT imaging system of FIG. 1.

Referring to FIGS. 2 and 3, the computer 34 is further provided to logically associate: (i) a measured respiratory state, and (ii) one or more digital images of an internal anatomy of the person obtained by internally scanning the person during the measured respiratory state. In particular, the computer receives the signal 200 generated by the respiratory monitoring device 48 indicative of a respiratory state of the person. The computer 34 stores both a time value (e.g., T0) and a respiratory state value (e.g., S0) associated with the signal 200 in the memory unit 42. Thereafter, the computer 34 associates each time value/respiratory state value pair (e.g., T0, S0) with a digital image (e.g., digital image 60) stored in the memory 42 that was obtained by internally scanning the person during the measured respiratory state (e.g., S0).

Referring to FIGS. 3, and 4-8, a method for generating a digital image indicative of an internal anatomy of a person over respiratory cycle will now be explained. The method can be implemented utilizing the CT imaging device 20 that generates computerized tomography images of internal anatomy of the person. In an alternate embodiment, the method could be utilized with a magnetic resonance imaging (MRI) scanning device to generate MRI digital images of the internal anatomy of the person. An advantage of the following method is that a digital image is generated that indicates a position of a tumor within a chest region of the person during a respiratory cycle of the person. For purposes of discussion, the term "2-D" means two-dimensional and the term "3-D" means three-dimensional.

Figure 4:
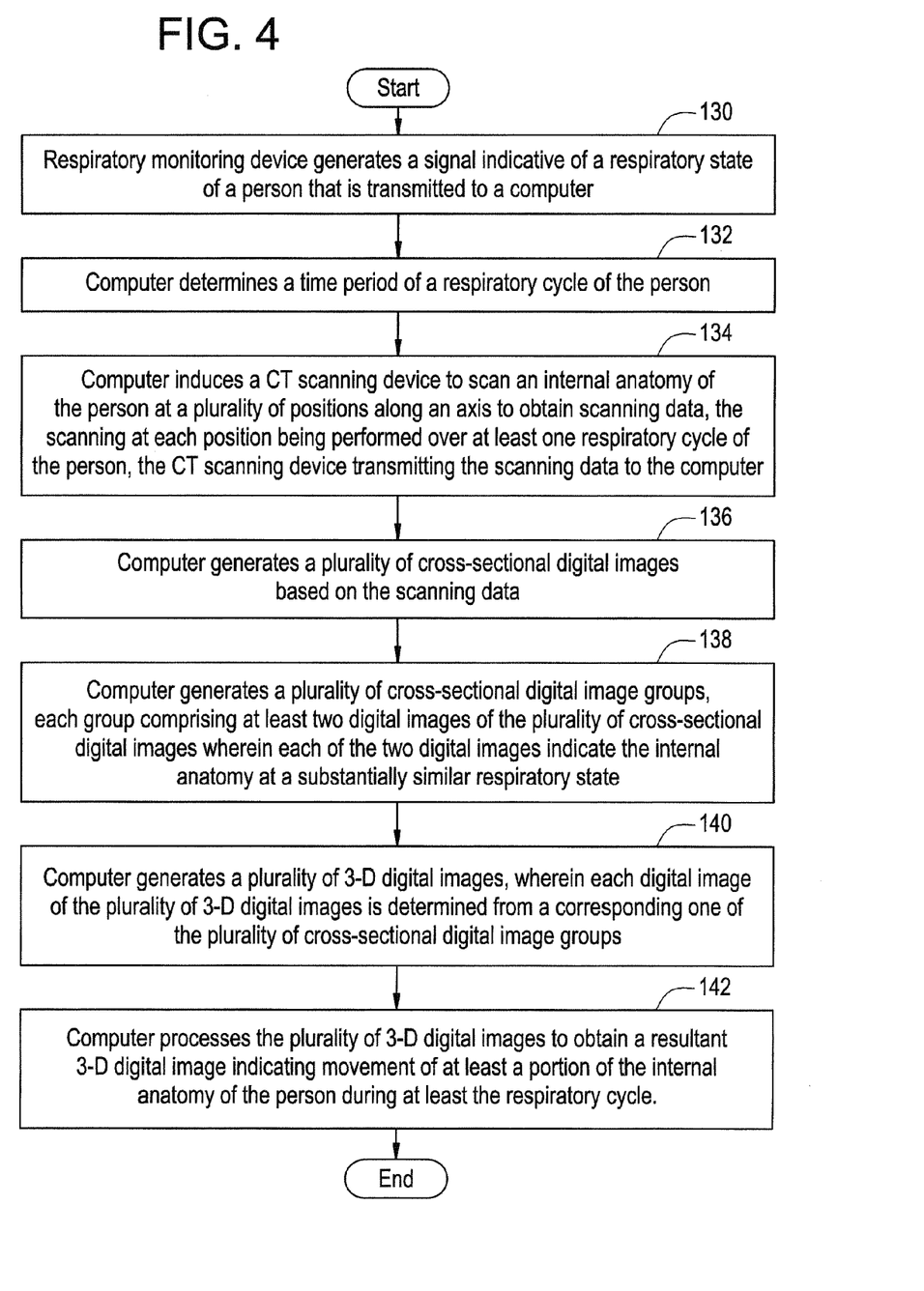
FIGS. 4-8 are flowcharts of a method for generating a digital image of an internal anatomy of a person over a respiratory cycle.

At step 130, the respiratory monitoring device 48 generates a signal 200 indicative of a respiratory state of a person that is transmitted to the computer 34.

Figure 9:
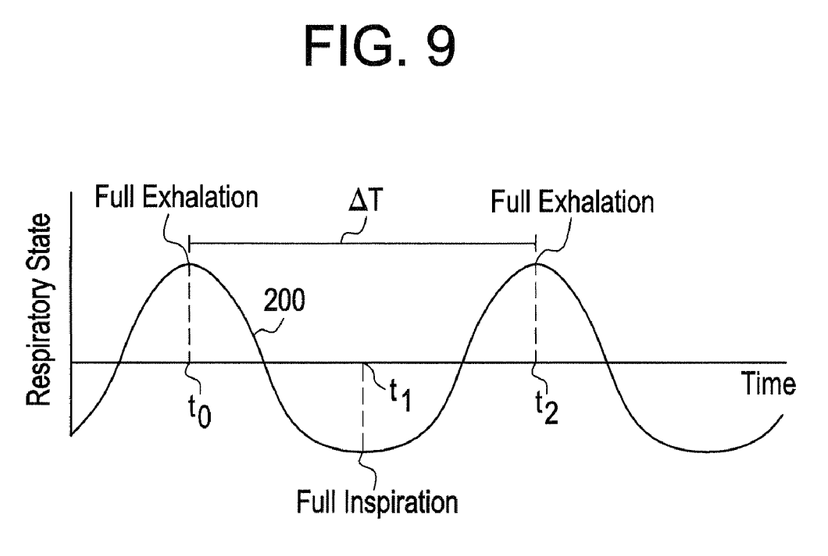
FIGS. 9-10 are signal schematics indicative of respiratory states of a person.
Figure 10:
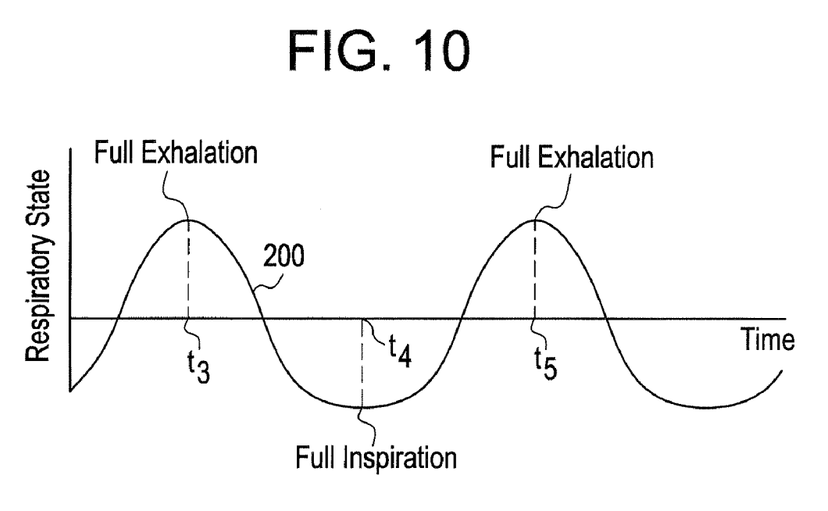

At step 132, the computer 34 determines a time period of a respiratory cycle of the person. For example, referring to FIG. 9 the computer 34 determines a respiratory cycle time period (ΔT) utilizing the following equation:

$$\Delta T = T2 - T0$$

At step 134, the computer 34 induces the CT scanning device 20 to scan an internal anatomy of the person at a plurality of positions along an axis 59 to obtain scanning data. The CT scanning device 20 scans the internal anatomy of the person at each predetermined position along axis 59 over at least one respiratory cycle of the person. Therefore, the CT scanning device 20 transmits the scanning data to the computer 34.

At step 136, the computer 34 generates a plurality of cross-sectional digital images based on the scanning data. For example, the computer 34 can generate digital images 60, 62, 64 at a first position along the axis 59 indicative of the internal anatomy of the person over at least one respiratory cycle.

Further, the computer 34 can generate digital images 66, 68, 70 at a second position along the axis 59 indicative of the internal anatomy of the person over at least one respiratory cycle. Of course, the computer 34 could generate more than three digital images at each position along the axis 59.

At step 138, the computer 34 generates a plurality of cross-sectional digital image groups, each group comprising at least two digital images of the plurality of cross-sectional digital images wherein each of the two digital images indicate the internal anatomy at a substantially similar respiratory state. For example, the computer 34 can generate cross-sectional digital image groups 80, 82, 84. The digital image group 80 includes digital images 60 and 66 that were obtained by scanning the person during a first predetermined respiratory state. Further, the digital image group 82 includes digital images 62 and 68 that were obtained by scanning the person during a second predetermined respiratory state. Further, the digital image group 84 includes digital images 64 and 70 that were obtained by scanning the person during a third predetermined respiratory state.

At step 140, the computer 34 generates a plurality of 3-D digital images, wherein each digital image of the plurality of 3-D digital images is determined from a corresponding one of the plurality of cross-sectional digital image groups. For example, the computer 34 can generate the 3-D digital image 90 from the cross-sectional digital image group 80. Further, the computer 34 can generate the 3-D digital image 92 from the cross-sectional digital image group 82. Further, the computer 34 can generate the 3-D digital image 94 from the cross-sectional digital image group 84.

At step 142, the computer 34 processes the plurality of 3-D digital images to obtain a resultant 3-D digital image indicating movement of at least a portion of the internal anatomy of the person during at least the respiratory cycle. For example, the computer can generate the resultant 3-D digital image 100 based upon the 3-D digital images 90, 92, 94. The step 100 can be implemented using steps 144-192.

Figure 5:
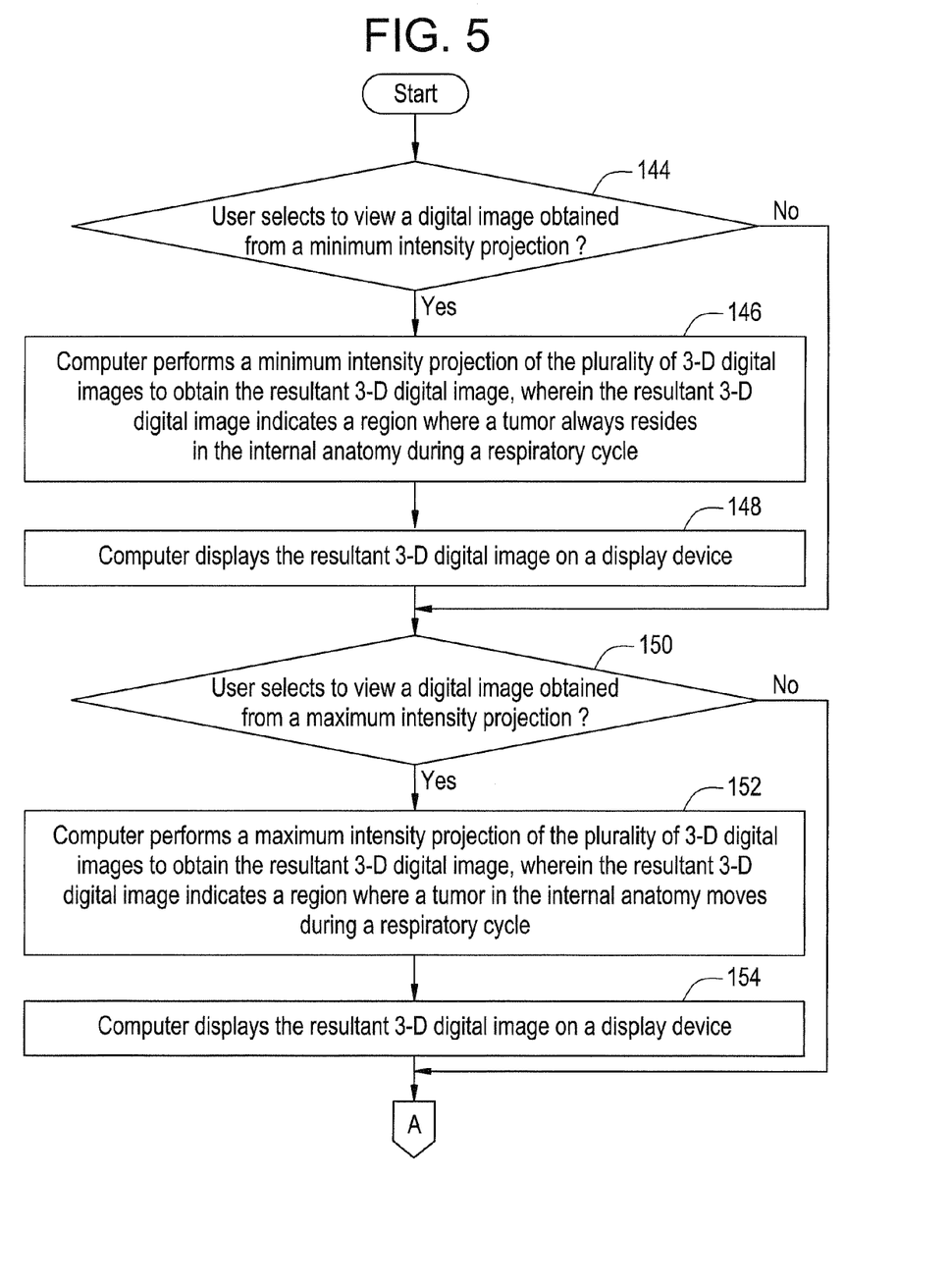

At step 144, the computer 34 makes a determination as to whether a user has selected to view a digital image obtained from a minimum intensity projection. It should be noted that a minimum intensity projection is performed by determining a plurality of minimum voxel intensity values associated with a plurality of digital images, wherein each minimum voxel intensity value corresponds to a lowest value of corresponding voxel intensity values in the plurality of digital images. If the value of step 144 equals "yes", the method advances to step 146. Otherwise, the method advances to step 150.

At step 146, the computer 34 performs a minimum intensity projection of the plurality of 3-D digital images 90, 92, 94 to obtain the resultant 3-D digital image, wherein the resultant 3-D digital image indicates a region where a tumor 76 always resides in the internal anatomy during a respiratory cycle. In particular, the minimum intensity projection of the 3-D digital images indicates a position of hypo-dense tissue (e.g., a tumor) that is less dense than tissue surrounding the hypo-dense tissue. In particular, the 3-D digital image comprises: (i) a first region having a first plurality of voxel intensity values indicative of tumor and a second region having a second plurality of voxel intensity values indicative of the internal anatomy surrounding the tumor, wherein each of the first plurality of voxel intensity values are less than each of the second plurality of voxel intensity values.

At step 148, the computer 34 displays the resultant 3-D digital image on a display monitor 46. The computer 34 can also store the resultant 3-D digital image in a memory (not shown) operably coupled to the computer 34. After step 148, the method advances to step 150.

At step 150, the computer 34 makes a determination as to whether a user has selected to view a digital image obtained from a maximum intensity projection. It should be noted that a maximum intensity projection is performed by determining a plurality of maximum voxel intensity values associated with a plurality of digital images, wherein each maximum voxel intensity value corresponds to a greatest value of corresponding voxel intensity values in the plurality of digital images. If the value of step 150 equals "yes", the method advances to step 152. Otherwise, the method advances to step 156.

At step 152, the computer 34 performs a maximum intensity projection of the plurality of 3-D digital images 90, 92, 94 to obtain a resultant 3-D digital image, wherein the resultant 3-D digital image indicates a region where a tumor in the internal anatomy moves during a respiratory cycle. In particular, the maximum intensity projection of the 3-D digital images indicates a position of hyper-dense tissue (e.g., a tumor) that has a greater density than tissue surrounding the hyper-dense tissue. The resultant 3-D digital image comprises a first region having a first plurality of voxel intensity values indicative of a hyper-dense tumor and a second region having a second plurality of voxel intensity values indicative of the internal anatomy surrounding the tumor, wherein each of the first plurality of voxel intensity values are greater than each of the second plurality of voxel intensity values.

At step 154, the computer 34 displays the resultant 3-D digital image on the display monitor 46. The computer 34 can also store the resultant 3-D digital image in a memory (not shown) operably coupled to the computer 34.

Figure 6:
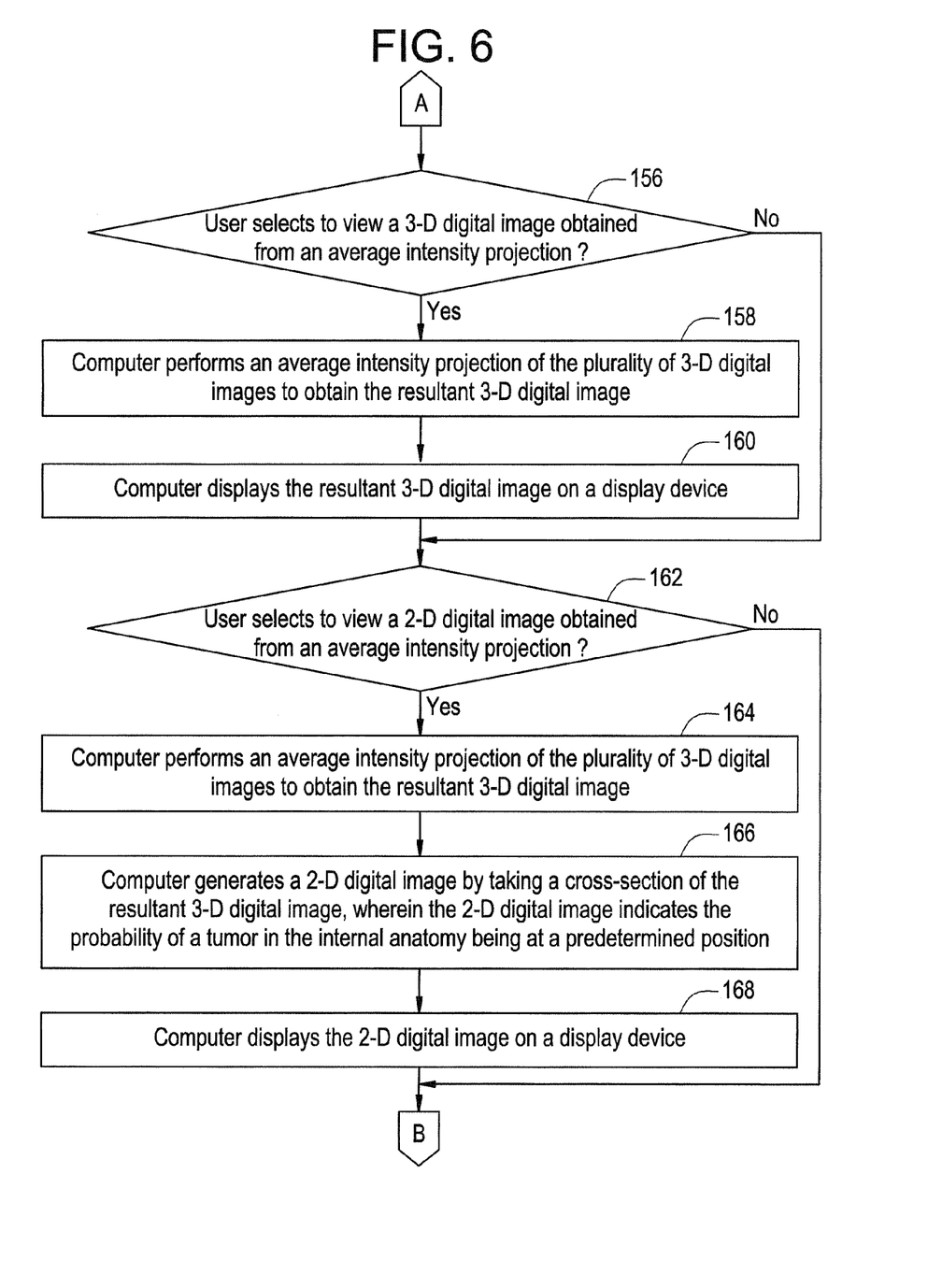

At step 156, the computer 34 makes a determination as to whether a user has selected to view a 3-D digital image obtained from an average intensity projection. It should be noted that an average intensity projection is performed by determining a plurality of average voxel intensity values associated with a plurality of digital images, wherein each average voxel intensity value corresponds to an average value of corresponding voxel intensity values in the plurality of digital images.

If the value of step 156 equals "yes", the method advances to step 158. Otherwise, the method advances to step 162.

At step 158, the computer 34 performs an average intensity projection of the plurality of 3-D digital images 90, 92, 94 to obtain the resultant 3-D digital image.

At step 160, the computer 34 displays the resultant 3-D digital image on the display monitor 46. The computer 34 can also store the resultant 3-D digital image in a memory (not shown) operably coupled to the computer 34.

At step 162, the computer 34 makes a determination as to whether a user has selected to view a 2-D digital image obtained from an average intensity projection. If the value of step 162 equals "yes", the method advances to step 164. Otherwise, the method advances to step 170.

At step 164, the computer 34 performs an average intensity projection of the plurality of 3-D digital images 90, 92, 94 to obtain the resultant 3-D digital image.

At step 166, the computer 34 generates a 2-D digital image by taking a cross-section of the resultant 3-D digital image, wherein the 2-D digital image indicates the probability of a tumor in the internal anatomy being at a predetermined position.

At step 168, the computer 34 displays the 2-D digital image on the display monitor 46. The computer 34 can also store the resultant 2-D digital image in a memory (not shown) operably coupled to the computer 34.

Figure 7:
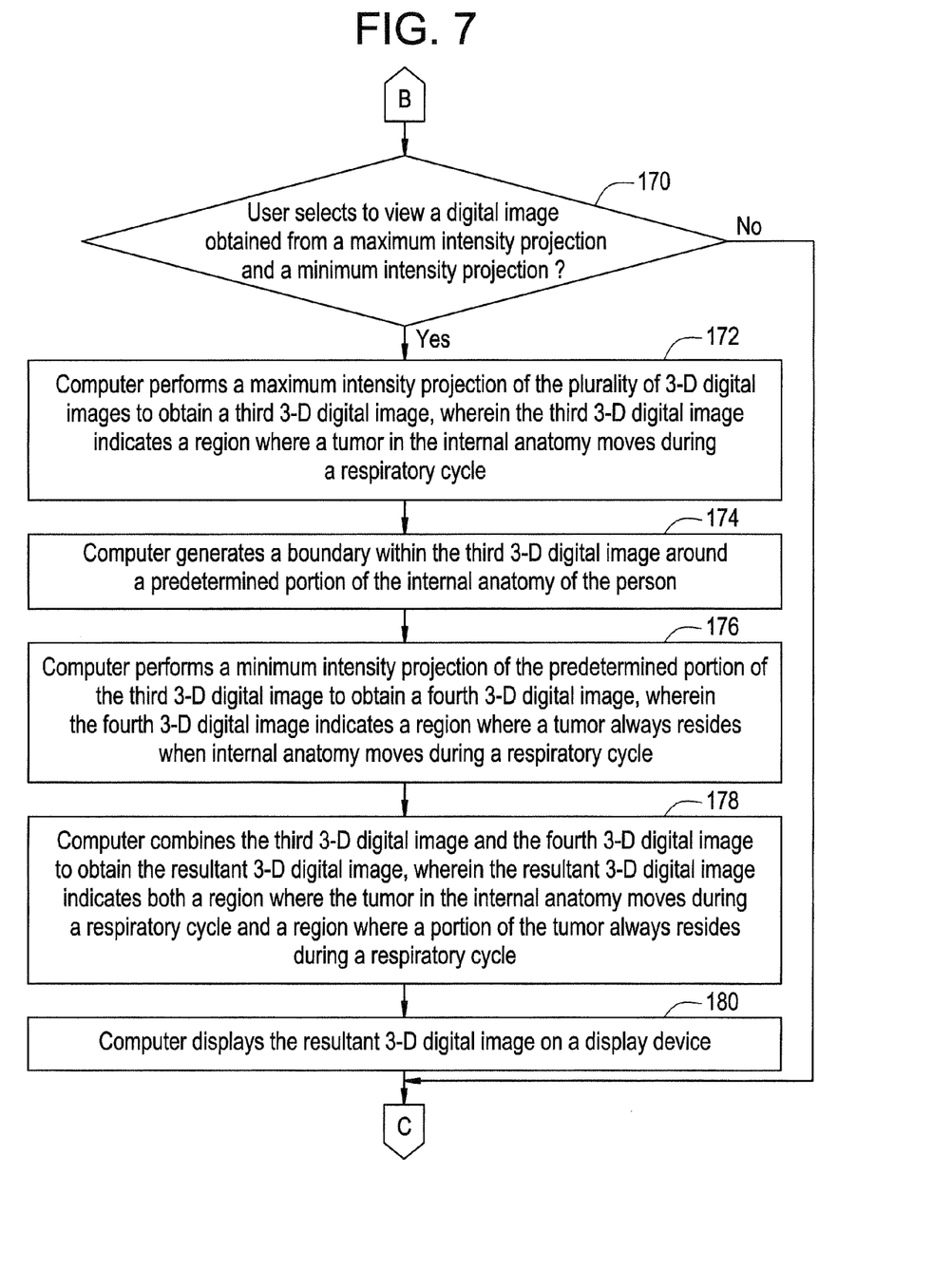

At step 170, the computer 34 makes a determination as to whether a user has selected to view a digital image obtained from a maximum intensity projection digital image and a minimum intensity projection digital image. If the value of step 170 equals "yes", the method advances to step 172. Otherwise, the method advances to step 182.

At step 172, the computer 34 performs a maximum intensity projection of the plurality of 3-D digital images 90, 92, 94 to obtain a first 3-D digital image, wherein the first 3-D digital image indicates a region where a tumor 76 in the internal anatomy moves during a respiratory cycle.

At step 174, the computer 34 generates a boundary or segmentation within the first 3-D digital image around a predetermined portion of the internal anatomy of the person.

At step 176, the computer 34 performs a minimum intensity projection of the predetermined portion of the first 3-D digital image to obtain a second 3-D digital image, wherein the second 3-D digital image indicates a region where a portion of a tumor 76 always resides when the internal anatomy moves during a respiratory cycle.

At step 178, the computer 34 combines the first 3-D digital image and the second 3-D digital image to obtain the resultant 3-D digital image, wherein the resultant 3-D digital image indicates both a region where the tumor 76 in the internal anatomy moves during a respiratory cycle and a region where a portion of the tumor 76 always resides during a respiratory cycle. The resultant 3-D digital images comprises: (i) a first region having a first plurality of voxel intensity values indicative of locations of a tumor during at least one respiratory cycle, and (ii) a second region having a second plurality of voxel intensity values indicative of the internal anatomy surrounding the tumor, wherein the first plurality of voxel intensity values are greater than each of the second plurality of voxel intensity values.

At step 180, the computer 34 displays the resultant 3-D digital image on the display monitor 46. The computer 34 can also store the resultant 3-D digital image in a memory (not shown) operably coupled to the computer 34.

Figure 8:
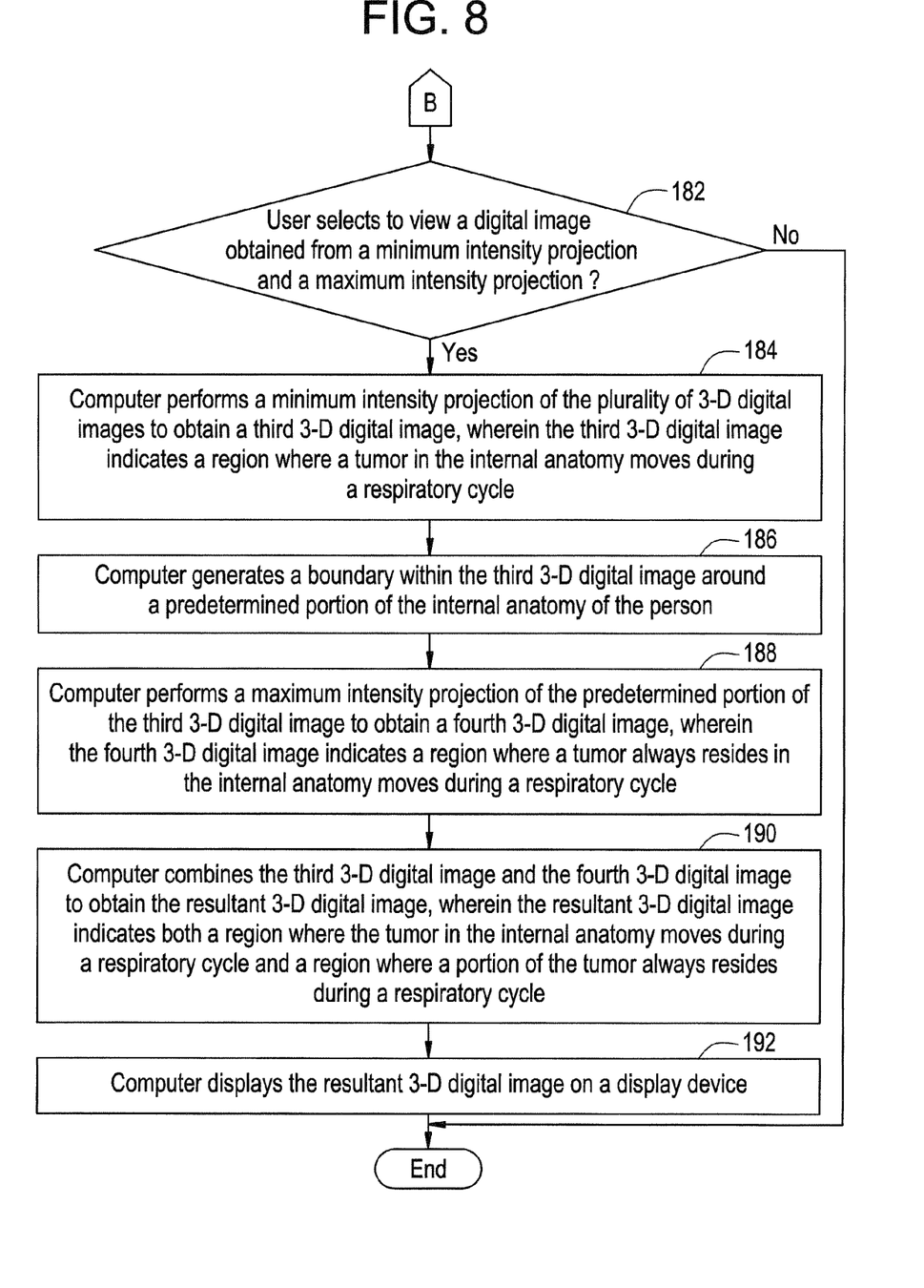

At step 182, the computer 34 makes a determination as to whether a user has selected to view a digital image obtained from a minimum intensity projection digital image and a maximum intensity projection digital image. If the value of step 182 equals "yes", the method advances to step 184. Otherwise, the method is exited.

At step 184, the computer 34 performs a minimum intensity projection of the plurality of 3-D digital images to obtain a third 3-D digital image, wherein the third 3-D digital image indicates a region where a tumor 76 in the internal anatomy moves during a respiratory cycle.

At step 186, the computer 34 generates a boundary or segmentation within the third 3-D digital image around a predetermined portion of the internal anatomy of the person.

At step 188, the computer 34 performs a maximum intensity projection of the predetermined portion of the third 3-D digital image to obtain a fourth 3-D digital image, wherein the fourth 3-D digital image indicates a region where a portion of the tumor 76 always resides when the internal anatomy moves during a respiratory cycle.

At step 190, the computer 34 combines the third 3-D digital image and the fourth 3-D digital image to obtain the resultant 3-D digital image, wherein the resultant 3-D digital image indicates both a region where the tumor 76 in the internal anatomy moves during a respiratory cycle and a region where a portion of the tumor always resides during a respiratory cycle. The resultant 3-D digital images comprises: (i) a first region having a first plurality of voxel intensity values indicative of locations of a tumor during at least one respiratory cycle, and (ii) a second region having a second plurality of voxel intensity values indicative of the internal anatomy surrounding the tumor, wherein the first plurality of voxel intensity values are less than each of the second plurality of voxel intensity values.

At step 192, the computer 34 displays the resultant 3-D digital image on the display monitor 46. The computer 34 can also store the resultant 3-D digital image in a memory (not shown) operably coupled to the computer 34. After step 192, the method is exited.

It should be noted that the computer 34 can color-code a portion of the resultant 3-D digital image utilizing a volume rendering display technique known to those skilled in the art.

The system and the method for generating a digital image of an internal anatomy of a person represent a substantial advantage over other systems and methods. In particular, the system and method have a technical effect of generating a digital image of an internal anatomy of the person during at least one respiratory cycle of the person that indicates a location of a tumor during the respiratory cycle.

As described above, the present invention can be embodied in the form of computer-implemented processes and apparatuses for practicing those processes. In an exemplary embodiment, the invention is embodied in computer program code executed on a computer. The present invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While embodiments of the invention are described with reference to the exemplary embodiments, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling within the scope of the intended claims. Moreover, the use of the term's first, second, etc. does not denote any order of importance, but rather the term's first, second, etc. are used to distinguish one element from another. Furthermore, the use of the terms a, an, etc. do not denote a limitation of quantity, but rather denote the presence of at least one of the referenced items.

We claim:

1. A method for generating a digital image indicative of an internal anatomy of a person, comprising:
scanning the internal anatomy of the person at a plurality of positions along an axis to obtain scanning data, wherein the scanning at each position is performed over at least one respiratory cycle of the person;
generating a plurality of cross-sectional digital images based on the scanning data;

generating first and second cross-sectional digital image groups associated with first and second respiratory states, respectively, of the person, the first cross-sectional digital image group including first and second digital images of the plurality of cross-sectional digital images obtained at first and second positions, respectively, along the axis, when the person has the first respiratory state, the second cross-sectional digital image group including third and fourth digital images of the plurality of cross-sectional digital images obtained at third and fourth positions, respectively, along the axis, when the person has the second respiratory state;

generating first and second 3-D digital images utilizing the first and second cross-sectional digital image groups, respectively; and generating a resultant 3-D digital image indicating at least a portion of the internal anatomy of the person utilizing the first and second 3-D digital images; and storing the resultant 3-D digital image in a memory device.

2. The method of claim 1, wherein generating the resultant 3-D digital image comprises:

performing a minimum intensity projection of the first and second 3-D digital images to obtain the resultant 3-D digital image.

3. The method of claim 2, wherein the resultant 3-D digital image comprises a first region having a first plurality of voxel intensity values indicative of a tumor and a second region having a second plurality of voxel intensity values indicative of the internal anatomy surrounding the tumor, wherein each of the first plurality of voxel intensity values are less than each of the second plurality of voxel intensity values.

4. The method of claim 1, wherein generating the resultant 3-D digital image comprises:

performing a maximum intensity projection of the first and second 3-D digital images to obtain the resultant 3-D digital image.

5. The method of claim 4, wherein the resultant 3-D digital image comprises a first region having a first plurality of voxel intensity values indicative of a tumor and a second region having a second plurality of voxel intensity values indicative of the internal anatomy surrounding the tumor, wherein each of the first plurality of voxel intensity values are greater than each of the second plurality of voxel intensity values.

6. The method of claim 1, wherein generating the resultant 3-D digital image comprises:

performing an average intensity projection of the first and second 3-D digital images to obtain the resultant 3-D digital image.

7. The method of claim 1, wherein generating the resultant 3-D digital image comprises:

performing a maximum intensity projection of the first and second 3-D digital images to obtain a third 3-D digital image;

generating a boundary within the third 3-D digital image around a predetermined portion of the internal anatomy of the person;

performing a minimum intensity projection of the predetermined portion of the third 3-D digital image to obtain a fourth 3-D digital image; and combining the third 3-D digital image and the fourth 3-D digital image to obtain the resultant 3-D digital image.

8. The method of claim 7, wherein the resultant 3-D digital image comprises a first region having a first plurality of voxel intensity values indicative of locations of a tumor during at least one respiratory cycle and a second region having a second plurality of voxel intensity values indicative of the internal anatomy surrounding the tumor, the first plurality of voxel intensity values being greater than each of the second plurality of voxel intensity values.

9. The method of claim 7, further comprising:

color coding a portion of the resultant 3-D digital image; and displaying the color-coded resultant 3-D digital image on a display monitor.

10. The method of claim 7, further comprising displaying the resultant 3-D digital image on a display monitor using a volume rendering technique.

11. The method of claim 7, further comprising storing the resultant 3-D digital image in a memory.

12. The method of claim 1, wherein generating the resultant 3-D digital image comprises:

performing a minimum intensity projection of the first and second 3-D digital images to obtain a third 3-D digital image;

generating a boundary within the third 3-D digital image around a predetermined portion of the internal anatomy of the person;

performing a maximum intensity projection of the predetermined portion of the third 3-D digital image to obtain a fourth 3-D digital image; and combining the third 3-D digital image and the fourth 3-D digital image to obtain the resultant 3-D digital image.

13. The method of claim 12, wherein the resultant 3-D digital image comprises a first region having a first plurality of voxel intensity values indicative of locations of a tumor during at least one respiratory cycle and a second region having a second plurality of voxel intensity values indicative of the internal anatomy surrounding the tumor, the first plurality of voxel intensity values being less than each of the second plurality of voxel intensity values.

14. The method of claim 12, further comprising;

color coding a portion of the resultant 3-D digital image; and displaying the color-coded resultant 3-D digital image on a display monitor.

15. The method of claim 12, further comprising displaying the resultant 3-D digital image on a display monitor using a volume rendering technique.

16. The method of claim 1, wherein scanning the internal anatomy of the person comprises monitoring a position on a chest of the person during respiration by the person to determine the time period of the respiratory cycle of the person.

17. The method of claim 1, wherein the at least a portion of the internal anatomy of the person comprises a tumor.

18. The method of claim 1, wherein the plurality of cross-sectional digital images comprises a plurality of computerized tomography images.

19. The method of claim 1, wherein the plurality of cross-sectional digital images comprises a plurality of magnetic resonance images.

20. The method of claim 1, wherein the first and second 3-D digital images comprises first and second 3-D computerized tomography images, respectively.

21. The method of claim 1, further comprising displaying at least a portion of the resultant 3-D digital image on a display monitor.

22. The method of claim 1, further comprising displaying a 2-D portion of the resultant 3-D digital image on a display monitor.

23. The method of claim 1, further comprising:

color coding a portion of the resultant 3-D digital image; and displaying the color-coded resultant 3-D digital image on a display monitor.

24. The method of claim 23, wherein the color-coded resultant 3-D digital image is generated using a volume rendering display technique.

25. A system for generating a digital image indicative of an internal anatomy of a person, comprising:
a respiratory monitoring device generating a first signal indicative of a respiratory state of the person;
a scanning device configured to scan internal anatomy of the person to obtain scanning data; and
a computer operably coupled to both the respiratory monitoring device and the scanning device, the computer configured to generate a plurality of cross-sectional digital images based on the scanning data, the computer further configured to generate first and second cross-sectional digital image groups associated with the first and second respiratory states, respectively, of the person, the first cross-sectional digital image group including first and second digital images of the plurality of cross-sectional digital images obtained at first and second positions, respectively, along the axis, when the person has the first respiratory state, the second cross-sectional digital image group including third and fourth digital images of the plurality of cross-sectional digital images obtained at third and fourth positions, respectively, along the axis, when the person has the second respiratory state, the computer further configured to generate first and second 3-D digital images utilizing the first and second cross-sectional digital image groups, respectively, the computer further configured to generate a resultant 3-D digital image indicating at least a portion of the internal anatomy of the person utilizing the first and second 3-D digital images, the computer further configured to store the resultant 3-D digital image in a memory device.

26. The system of claim 25, wherein the computer is further configured to perform a minimum intensity projection of the first and second 3-D digital images to obtain the resultant 3-D digital image.

27. The system of claim 26, wherein the resultant 3-D digital image comprises a first region having a first plurality of voxel intensity values indicative of a tumor and a second region having a second plurality of voxel intensity values indicative of the internal anatomy surrounding the tumor, wherein each of the first plurality of voxel intensity values are less than each of the second plurality of voxel intensity values, 28. The system of claim 25, wherein the computer is further configured to perform a a maximum intensity projection of the first and second 3-D digital images to obtain the resultant, 3-D digital image.

29. The system of claim 28, wherein the resultant 3-D distal image comprises a first region having a first plurality of voxel intensity values indicative of a tumor and a second region having a second plurality of voxel intensity values indicative of the internal anatomy surrounding the tumor, wherein each of the first plurality of voxel intensity values are greater than each of the second plurality of voxel intensity values.

30. The system of claim 25, wherein the computer is further configured to perform an average intensity projection of the first and second 3-D digital images to obtain the resultant 3-D digital image.

31. The system of claim 25 wherein the computer is further configured to perform a maximum intensity projection of first and second 3-D digital images to obtain a third 3-D digital image;
the computer being further configured to generate a boundary within the third 3-D digital image around a predetermined portion of the internal anatomy of the person;
the computer being further configured to perform a minimum intensity projection of the predetermined portion of the third 3-D digital image to obtain a fourth 3-D digital image; and
the computer being further configured to combine the third 3-D digital image and the fourth 3-D digital image to obtain the resultant 3-D digital image.

32. The system of claim 31, wherein the resultant 3-D digital image comprises a first region having a first plurality of voxel intensity values indicative of locations of a tumor during at least one respiratory cycle, and a second region having a second plurality of voxel intensity values indicative of the internal anatomy surrounding the tumor, the first plurality of voxel intensity values being greater than each of the second plurality of voxel intensity values.

33. The system of claim 31, wherein the computer is further configured to color code a portion of the resultant 3-D digital image and to display the color-coded resultant 3-D digital image on a display monitor.

34. The system of claim 31, further comprising displaying the resultant 3-D digital image on a display monitor using a volume rendering technique.

35. The system of claim 31, further comprising storing, the resultant 3-D digital image in a memory.

36. Tile system of claim 25, wherein the computer is further configured to perform a minimum intensity projection of the first and second 3-D digital images to obtain a third 3-D digital image;
the computer being further configured to generate a boundary within the third 3-D digital image around a predetermined portion of the internal anatomy of the person;
the computer being further configured to perform, a maximum intensity projection of the predetermined portion of the third 3-D digital image to obtain a fourth 3-D digital image; and
the computer being further configured to combine the third 3-D digital image and the fourth 3-D digital image to obtain the resultant 3-D digital image.

37. The system of claim 36, wherein the resultant 3-D digital images comprises a first region having a first plurality of voxel intensity values indicative of locations of a minor during at least one respiratory cycle and a second region having a second plurality of voxel intensity values indicative of the internal anatomy surrounding the tumor, the first plurality of voxel intensity values being less than each of the second plurality of voxel intensity values.

38. The system of claim 36 wherein the computer is further configured to color code a portion of the resultant 3-D digital image, and to display the color-coded resultant 3-D distal image on a display monitor.

39. The system of claim 36, wherein the computer is further configured to display the resultant 3-D digital image on a display monitor using a volume rendering technique.

40. The system of claim 36, wherein the computer is further configured to store the resultant 3-D digital image in a memory.

41. The system of claim 25, wherein the at least a portion of the internal anatomy of the person comprises a tumor.

42. The system of claim 25, wherein the plurality of cross-sectional digital images comprises a plurality of computerized tomography images.

43. The system of claim 25, wherein the plurality of cross-sectional digital images comprises magnetic resonance images.

44. The system of claim 25, wherein the first and second 3-D digital images comprise first and second 3-D computerized tomography images, respectively.

45. The system of claim 25, wherein the computer is fresher configured to display at least a portion of the resultant 3-D digital image on a display monitor.

46. The system of claim 25, wherein the computer is further configured to display a 2-D portion of the respirator 3-D digital image on a display monitor.

47. The system of claim 25, wherein the computer is further configured color code a portion of the resultant 3-D digital image and to display ~le cot or-coded resultant 3-D digital image on a display monitor.

48. The system of claim 47, wherein the color-coded resultant 3-D digital image is generated using a volume rendering display function.

49. An article of manufacture, comprising:
a computer storage medium having a computer program encoded therein for generating a digital image indicative of an internal anatomy of a person, the computer storage medium comprising:
code for inducing a scanning device to scan the internal anatomy of the person at a plurality of positions along an axis to obtain scanning data, wherein the scanning at each position is performed over at least one respiratory, cycle of the person;
code for generating a plurality of cross-sectional digital images based on the scanning data;
code for generating first and second cross-sectional digital image groups associated with the first and second respiratory, states, respectively, of the person, the first cross-sectional digital image group including first and second digital images of the plurality of cross-sectional digital images obtained at first and second positions, respectively, along the axis, the when the person has the first respiratory state, the second cross-sectional digital image group including third and fourth digital images of the plurality of cross-sectional digital images obtained at third and fourth positions, respectively, along the axis, when the person has the second respiratory state;
code for generating first and second 3-D digital images utilizing the first and second cross-sectional digital image groups, respectively;
code for generating a resultant 3-D digital image indicating at least a potion of the internal anatomy of the person utilizing the first and second 3-D digital images; and
code for storing the resultant 3-D digital image in a memory device.

* * * * *